Aug. 29, 1967   N. C. WILEY, JR ETAL   3,338,126
MUSIC KEY AND CHORD FINDER, TRANSPOSER AND PROGRESSION
AND ARRANGER DEVICE FOR STRINGED INSTRUMENTS
Filed Feb. 10, 1966   3 Sheets-Sheet 1
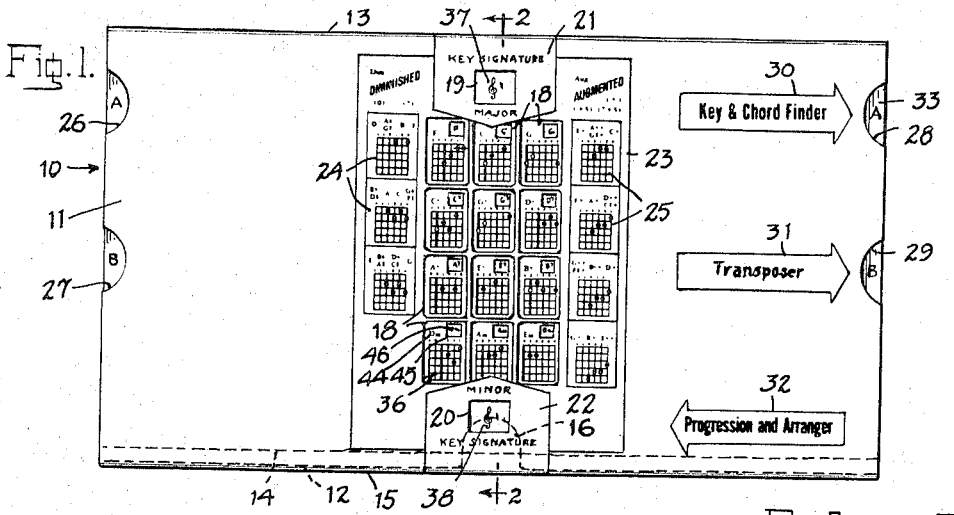
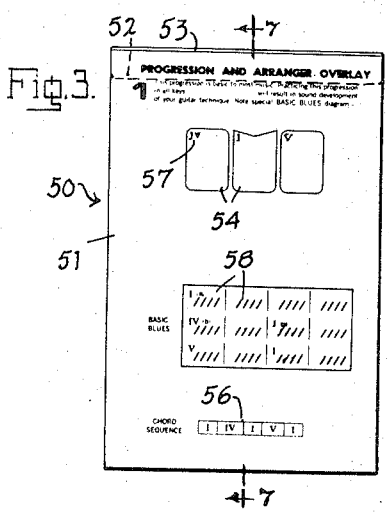
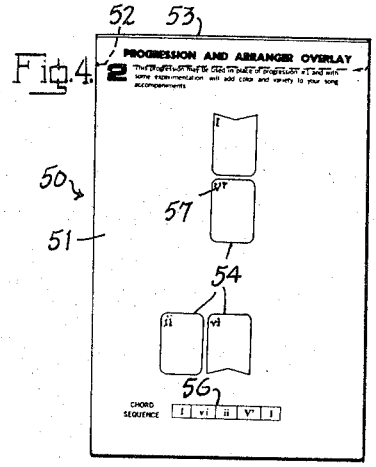
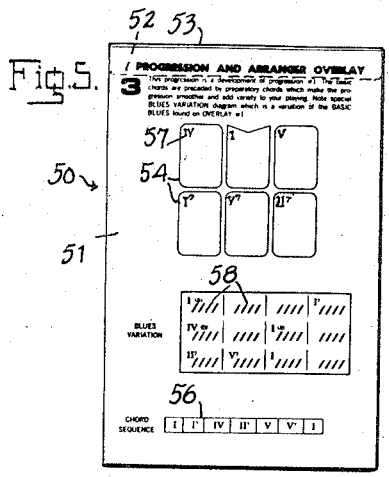
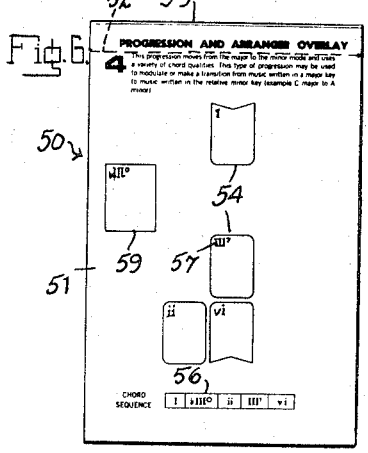
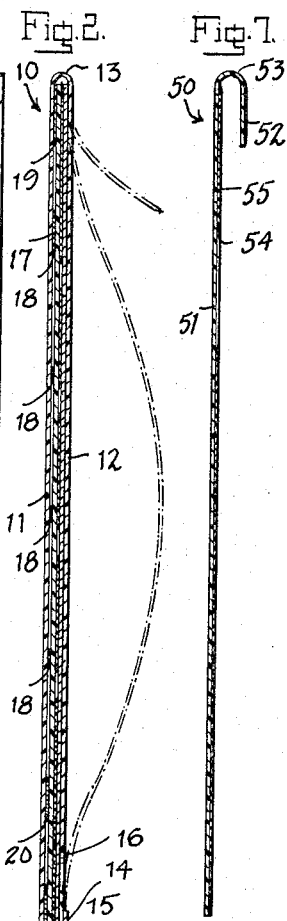
INVENTORS.
NATHANIEL C. WILEY, JR.
AND HENRY A. RUDKIN, JR.
ATTORNEYS.

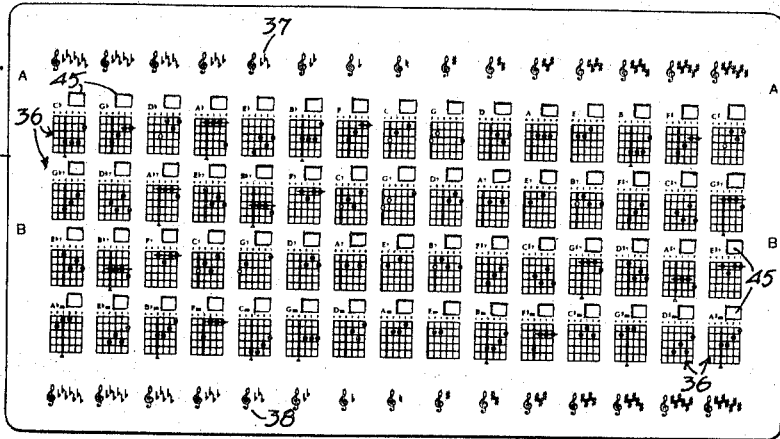
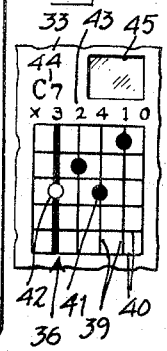
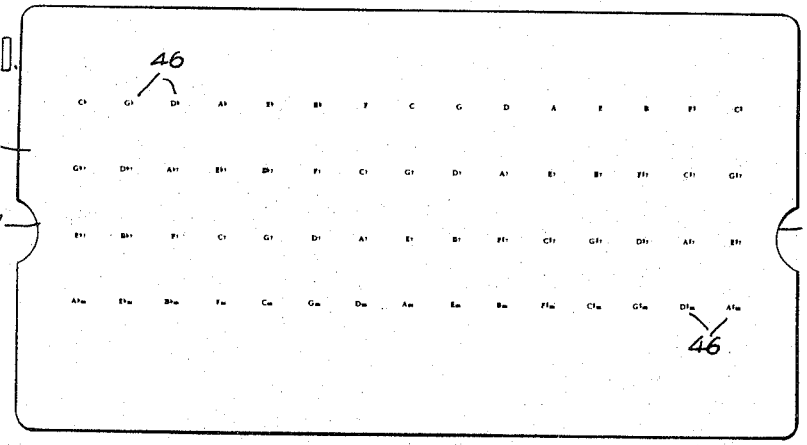
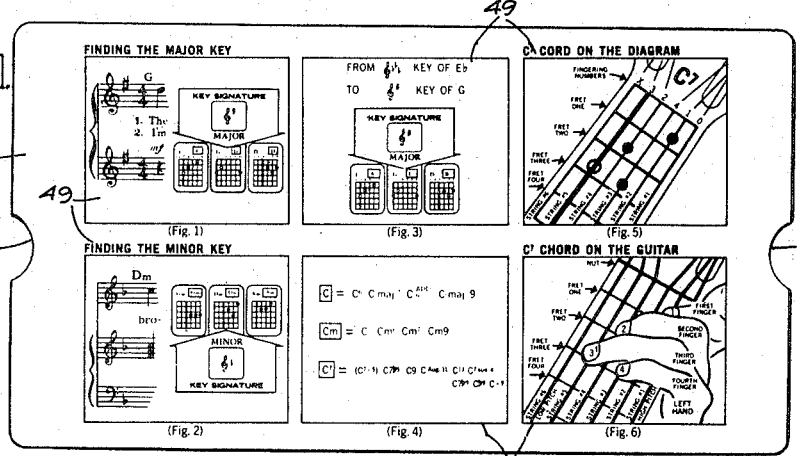

United States Patent Office 3,338,126
Patented Aug. 29, 1967

3,338,126
MUSIC KEY AND CHORD FINDER, TRANSPOSER AND PROGRESSION AND ARRANGER DEVICE FOR STRINGED INSTRUMENTS
Nathaniel C. Wiley, Jr., Weston, and Henry A. Rudkin, Jr., Fairfield, Conn., assignors to Rudkin-Wiley Corporation, Seymour, Conn., a corporation of Connecticut
Filed Feb. 10, 1966, Ser. No. 526,442
10 Claims. (Cl. 84—485)

The present invention relates to a music key and chord finder, transposer and progression and arranger device for stringed instruments, and has for an object to provide a device of this character of slide-rule type and of simple construction and easy operation, wherein simplified and standard chords are graphically illustrated as chord diagrams imposed upon string and fret representations, such diagrams being adjustable in relation to major and minor key signature designations to enable music students through manipulation of the device to acquaint themselves with chord construction and theory and at the same time to directly apply the graphically illustrated selected chord diagrams to the actual playing of a stringed instrument, for example a guitar. While the present disclosure is particularly concerned with chord instruction in connection with the playing of a guitar, the invention also contemplates chord instruction in connection with similar stringed and fretted musical instruments, for example, banjos, mandolins, ukuleles and the like.

A further object is to provide a key and chord finder device in which is incorporated means for graphically indicating transpositions to different keys.

Another object is to provide a series of overlays adapted for individual selective placement into relation with selected key signature chord diagrams to graphically illustrate a progression or sequence of musically related chords.

Another object is to provide a device in which are incorporated directions and illustrations setting forth the manner in which the information afforded by the chord diagrams may be applied in the actual playing of the musical instrument, and to this end it is proposed to provide such directions and illustrations upon cooperative parts of the device in such relation that the music student may readily study them without disturbing the adjusted positions of the slide panels forming parts of the device.

Other objects and advantages will become apparent from a consideration of the following detailed description taken in connection with the accompanying drawings where a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a front elevation of a device according to the invention with the slide panels in position to indicate natural C Major or A Minor keys;

FIG. 2 is a vertical, sectional view on an enlarged scale taken along the line 2—2 of FIG. 1, the dot-and-dash lines indicating manipulated positions of the back panel of the body member of the device;

FIGS. 3, 4, 5 and 6 are front elevational views of a series of progression and arranger overlays;

FIG. 7 is a vertical sectional view on an enlarged scale taken along the line 7—7 of FIG. 3;

FIG. 8 is a front elevational view of the chord diagram slide panel;

FIG. 9 is a fragmentary front elevational view showing one of the chord diagrams on an enlarged scale;

FIG. 10 is a front elevational view of the transposer slide panel;

FIG. 11 is a rear elevational view of the transposer slide panel containing graphic illustrations explaining the operation and use of the device;

Figure 12:
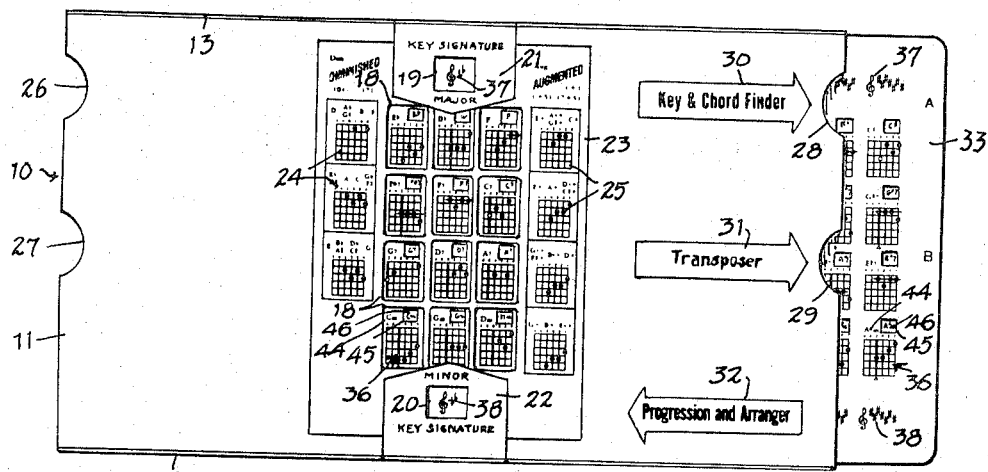
FIG. 12 is a front elevational view showing the chord diagram and transposer slide panels in a relatively moved position in relation to the body member of the device.
Figure 13:
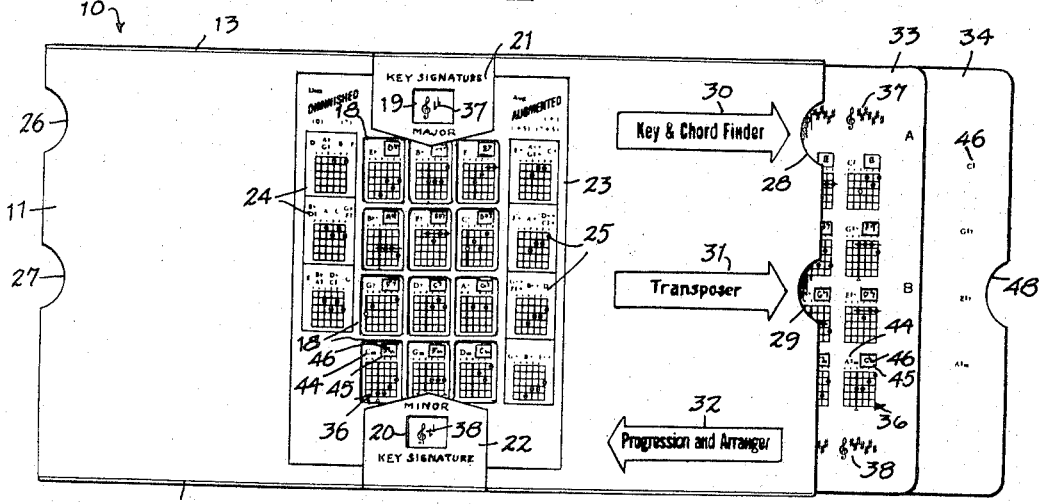
FIG. 13 is a front elevational view showing the chord diagram slide panel in a relatively moved position to transposer slide panel.

Referring to the drawings, the device according to the exemplary embodiment of the invention illustrated therein comprises a sleeve-like body member 10 of rectangular form consisting of a front panel 11, a back panel 12 connected to the upper edge of the front panel by a bend or fold 13 and a back flange 14 connected to lower edge of front panel by a fold or bend 15, and which flange is adapted to receive and retain the lower marginal portion of the back panel. The body member is preferably formed of relatively stiff transparent vinyl sheet material having a degree of flexibility with the upper and lower folds or bends 13 and 15 rendered substantially rigid by localized heat-setting of the vinyl material by well-known methods. Thus the rectangular body member is rendered substantially rigid longitudinally and the back panel has the capability of being readily flexed to the positions indicated by the dot-and-dash lines in FIG. 2, to enable it to be disengaged from flange 14 and swung to the position indicated by the upper dot-and-dash lines to expose printed material carried upon the rear side of the transposer slide panel, as will hereinafter more fully appear. To facilitate the engagement or disengagement of the back panel with the flange 14, the back panel is provided centrally within its lower edge with a cutout 16 extending above the flange 14 so that through engagement of the thumb in the cutout and exertion of upward pressure thereon the back panel may be forced to the flexed position out of engagement with the flange as shown by the dot-and-dash lines in FIG. 2.

The front panel is provided at its inner side with an opaque coating 17 which overlies various printed indicia applied by suitable printing methods to the inner surface of the front panel and visible from the front by virtue of the transparency of the front panel. In the central or median area of the front panel the opaque coating is omitted to provide twelve transparent windows 18 of rectangular outline arranged in four horizontal and three vertical rows, as well as a pair of rectangular windows 19 and 20 disposed along the vertical center line of the body member in vertical alignment above and below the central vertical row of windows 18.

The windows 19 and 20 are respectively disposed within arrow-shaped printed areas 21 and 22 respectively pointed toward the upper and lower windows of the central vertical row of windows 18, each being identified by the designation "KEY SIGNATURE," and the respective areas being further identified by the designations "MAJOR" and "MINOR." The windows 18 and the areas 21 and 22 are disposed within a median rectangular block area 23 extending laterally beyond the windows and containing at one side of the windows printed chord diagrams 24 identified by the designation "DIMINISHED" and containing at the other side of the windows printed chord diagrams 25 identified by the designation "AUGMENTED," the cord diagrams 24 and 25 being disposed in vertical rows and horizontally aligned with the horizontal rows of windows 18.

In the left hand edge of the body member there are provided in both the front and back panels a pair of cutout thumb notches 26 and 27, and in the right hand edge there are provided a similar pair of cutout notches 28 and 29, for the purpose of facilitating the manipulation of the slide panels of the device as will hereinafter more fully appear.

The upper notches 26 and 28 are designated by an arrow representation 30 entitled "Key & Chord Finder" and the lower notches 27 and 29 are designated by an arrow representation 31 entitled "Transposer." A third arrow representation 32 entitled "Progression and Arranger," is directed toward the median block area 23 for the purpose of indicating the position for placement of the overlay members upon the body member, as will hereinafter more fully appear.

The folds 13 and 15 at the upper and lower edges of the body member constitute parallel longitudinal slideways for a pair of superimposed rectangular slide panels 33 and 34 disposed within the body member, these slide panels corresponding in length to the length of the body member and being of a width to enable their longitudinal upper and lower edges to have a snug sliding fit within the slideways so that relative sliding movement of the slide panels will not result in any appreciable deviation in longitudinal alignment of the slide panels with the body member and with each other.

The slide panel 33 may be characterized as a chord diagram panel and, like the body member, is preferably formed of a relatively stiff transparent vinyl sheet, upon the rearward side of which chord diagrams and key signature symbols are printed so that they are visible through the transparent sheet, such printed material being covered at the rearward side of the panel by an opaque coating 35. The printed chord diagrams 36 are arranged in four horizontal rows of fifteen diagrams each, with the diagrams of the lower rows vertically aligned, the horizontal and vertical rows being so spaced that in any position of relative adjustment of the slide panel 33 relative to the body member 12, twelve chord diagrams are visible through the windows 18.

In vertical alignment above and below the vertical rows of chord diagrams there are provided key symbols 37 and 38 arranged in longitudinal line with the windows 19 and 20, so that the major and minor key signatures of the vertical rows will appear in the windows 19 and 20 when such rows are aligned with the arrow designations 21 and 22. The central key signature designations represent natural keys and the key signature representations extending to the right and left thereof represent the conventional sequence of sharp and flat keys. The upper row of chord diagrams are major chords, the lower row are minor chords, the upper intermediate row are major 7ths chords, and the lower intermediate row are minor 7ths chords.

As shown in detail in FIG. 9, each chord diagram is of rectangular outline and includes six vertical string indicating lines 39 and six horizontal fret indicating lines 40. The black dots 41 and the circles 42 show where to press the fingers of the left hand, the black dots designating essential notes of the chord while the circles designate optional notes which may be omitted at first if too difficult. The bar across two or more dots, as shown in various of the chord diagrams in FIG. 8, indicates that these strings are to be pressed at the same time by laying the first finger across the strings where the bar is shown. The series of numbers 43 above the diagram tell which fingers to use, the "0" indicating that the string is to be played but no fingering of that string is necessary, the "X" indicating a string that is not to be played, and the numbers "1," "2," "3" and "4" indicating that the first, second, third and fourth fingers are to be placed on the designated strings. The heavy line representing the string shown in relation to the finger designation "3" indicates the strings to be struck first "singly" then followed by a strum of the remaining strings for the bass strum style. Each chord diagram is identified by a chord symbol 44.

Included in each chord diagram, preferably to the right of the chord symbol 44, is a transparent rectangular window 45 provided by omitting the opaque coating 35 in the window areas, these windows being for the purpose of indicating transposed keys, as will presently more fully appear.

The slide panel 34 may be characterized as a transposer panel and is preferably formed of an opaque material, for example relatively stiff cardboard. Printed upon its forward surface are horizontal and vertical rows of key symbols 46 which are spaced in correspondence to the spacing of the windows 45 of the chord diagram panel 33, and which correspond to the key symbols of the several chord diagrams. Chord symbols 44 may be printed in black and the key symbols 46 are preferably printed in a contrasting color, for example red. Thus, when the slides are in register, for example, as seen in FIG. 1, the red key symbol 46 appearing in the window of each chord diagram corresponds to the black chord symbol 44 of such chord diagram. Transposition is brought about by longitudinal movement of the chord diagram slide 33 relatively to the transposer slide 34 so that the selected key shown by the transposer slide remains in alignment with the key signature windows 19 and 20 and the transposed chords are shown by the chord diagrams in the relatively moved position of the chord diagram chart to the transposer slide. Thus, within each chord diagram window 18 the original chord symbols will appear in red in the small window 45 of each chord diagram, and the new transposed chord symbols will appear in black in each chord diagram window.

Where the chords for different keys are to be shown without transposition, the two slides are moved together as shown in FIG. 12. To facilitate the movement of the slides together, they are grasped in the upper notches at one or the other end of the body member at the point indicated by the letter "A" at one or the other end of the chord diagram slide 33. When one slide is to be moved relatively to the other, the front slide only is grasped within one or the other of the lower notches at the point indicated by the letter "B," the transposer slide 34 being provided at its respective ends with cutout thumb notches 47 and 48 for this purpose.

Upon the rearward side of the transposer slide (FIG. 11), there are printed various illustrations 49 graphically showing how the device is to be operated and the manner in which the chord diagrams may be converted to actual placing of the fingers upon the strings and frets of the musical instrument.

The back panel 12 of the body member is illustrated in FIG. 2 as being transparent, in which case the illustrations 49 upon the rearward side of the transposer slide panel 34 are visible with the back panel in its normal position. However, the back panel may in a preferred arrangement of the invention be provided with printed text setting forth detail directions for operation of the device, and which may make reference to and be read in conjunction with the illustrations upon the rearward side of the transposer slide panel. In such case the printed text is applied by suitable printing methods to the inner surface of the transparent back panel and an opaque coating is applied over the printed text in similar manner to the application of the printed matter and opaque coating to the front panel 11. With this arrangement the back panel may be flexed to the position indicated by the dot-and-dash lines, so that both the printed text upon the back panel and the illustrated material upon the rearward side of the transposer slide panel may be simultaneously studied without disturbing the setting of the slide panels.

In FIGS. 3–7 there is illustrated a series of progression and arranger overlay members 50, each formed of relatively stiff transparent vinyl sheet material and comprising a rectangular overlay panel 51 having a hook formation along its upper edge provided by a rearwardly disposed flange 52 connected to the upper edge of the panel 51 by a bend or fold 53 which, as in the case of the folds or bends 13 and 15 of the body member, is rendered substantially rigid by well-known localized heat-setting methods. The panel 51 is of a size substantially corresponding to the outline of the median block area 23 of the body member and in the use of the overlay is positioned in register over the block area by hooking over the upper fold 13 of the body member as shown in FIG. 14.

A progression is a musically related sequence of chords and, in order to identify the chord sequence and expose the chord progression, the panel 51 is provided with the required printed instructions and indicia and with suitably arranged transparent see-through windows 54 which are provided by printing upon the inner surface of the panel and providing an opaque coating 55 at its inner side with portions of the coating omitted to provide the transparent windows. In addition to the printed chord sequence indicia 56 which includes symbols usde in notating diatonic harmonies, the same symbols are shown as at 57 in the respective windows 54. The overlay may also include beat or pulse indications for each chord in the form of slash marks 58.

Figure 14:
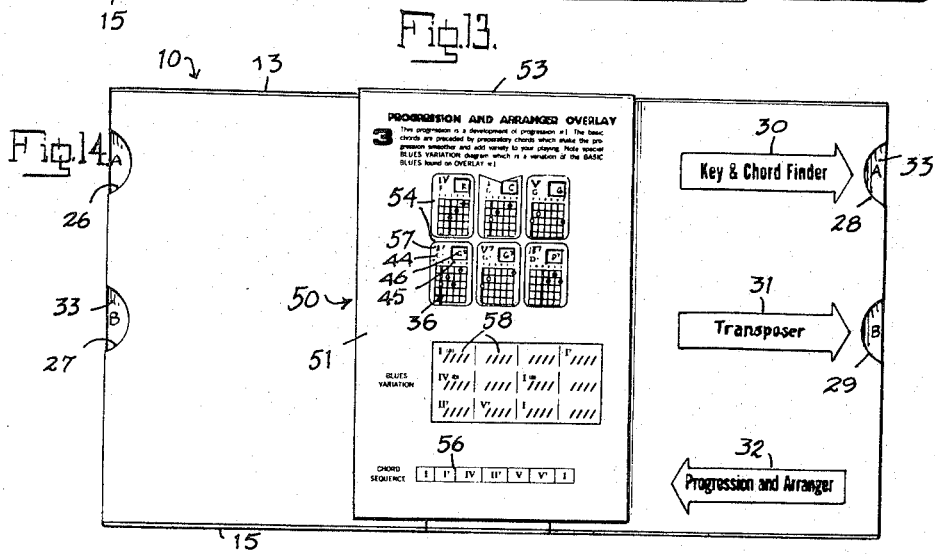
FIG. 14 is a front elevational view showing the overlay illustrated in FIG. 5 in cooperative relation with the device.

In the engaged relation of the overlay with the body member as seen in FIG. 14, the related chords of the chord diagram slide panel 33 will appear in the overlay windows 54. In certain progressions the DIMINISHED or the AUGMENTED chords 24 and 25 shown within the block area 23 to the right and left of the windows 18 of the body member may be included in the chord sequence of the overlay member. In the overlay member shown in FIG. 6, for example, a window 59 is provided which will expose the second DIMINISHED chord 24. While four examples of progression and arranger overlays are shown it will be understood that any desired number may be provided for use in cooperation with the device of the invention.

In addition to positioning and retaining the individual overlay member in its operative position the hook formation permits a number of overlay members to be positioned upon the body member at either or both of its forward and rearward sides by hooking over either or both of its upper and lower edges, to thus provide a compact assembled package for shipping or storage.

Having described our invention, what we claim as new and desire to secure by Letters Patent is:

1. A music key and chord finder and key transposition device for stringed instruments comprising:
   a body member including a front panel and slideway means defining a longitudinally extending slideway space at the inner side of said front panel;
   a first slide panel disposed adjacent to and beneath said front panel;
   a second slide panel disposed adjacent to and beneath said first slide panel;
   said first and second slide panels being engaged with said slideway means for longitudinal movement in said slideway space relatively to said body member and to each other;
   said second slide panel having upon its side adjacent said first slide panel a plurality of key symbols arranged in equally spaced relation in horizontal and vertical rows;
   said first slide panel having a plurality of see-through windows each arranged to register with and expose a given key symbol of said second slide panel in a given relationship of said slide panels and to expose different key symbols of said second slide panel in longitudinally moved positions of one slide panel relatively to the other;
   said first slide panel having upon its side adjacent said front panel a plurality of chord diagrams each adjacently associated with one of said see-through windows thereof; and
   said front panel having in its median area window means arranged to expose a fractional number of said vertical rows of said chord diagrams in any position of longitudinal adjustment of said first slide panel relatively to said body member.

2. The invention as defined in claim 1, wherein said windows of said first slide panel correspond in number to said key symbols of said second slide panel, and wherein each of said chord diagrams of said first slide panel includes a key symbol identifying the chord and corresponding to the key symbol of said second slide panel visible through the window associated with said chord diagram in said given relationship of said slide panels.

3. The invention as defined in claim 1, wherein said first slide panel has a horizontal row of key signature symbols vertically aligned with said vertical rows of chord diagrams, and wherein said front panel of said body member has a see-through window horizontally aligned with said key signature symbols and vertically aligned with the vertical center line of said window means of said front panel.

4. The invention as defined in claim 1, wherein said horizontal rows of chord symbols are four in number with the top row representing major chords, the bottom row representing minor chords, the intermediate row adjacent said top row representing major 7th chords, and the intermediate row adjacent said bottom row representing minor 7th chords, and wherein said vertical rows are fifteen in number with the center row representing natural keys, and the seven rows at the respective sides of said center row respectively representing sharp and flat keys in sequential order starting from said center row.

5. The invention as defined in claim 4, wherein said first slide panel has a first horizontal row of key signature symbols, disposed above and vertically aligned with said vertical rows of chord diagrams and representing major keys, and a second horizontal row of key signature symbols, disposed below and vertically aligned with said vertical rows of chord diagrams and representing minor keys, and wherein said front panel of said body member has a pair of see-through windows respectively in longitudinal line with said first and second rows of key signature symbols and each vertically aligned with the vertical center line of said front panel.

6. The invention as defined in claim 4, wherein said window means of said front panel comprises three vertical rows of four windows each arranged to simultaneously expose three adjacent vertical rows of said chord diagrams of said first slide panel.

7. The invention as defined in claim 1, wherein said body member comprises a rectangular piece of flexible sheet material including a rectangular front panel, a rectangular back panel connected along one longitudinal edge by a fold to one longitudinal edge of said front panel, the other longitudinal edge of said back panel being free, and a longitudinal back flange connected by a fold to the other longitudinal edge of said front panel, said free edge of said back panel being normally engaged with the inner side of said flange and adapted through flexing of said back panel to be disengaged therefrom, and said folds constituting longitudinal slideways for the longitudinal edges of said first and second slide panels.

8. The invention as defined in claim 7, wherein said free edge of said back panel is provided substantially centrally with a cutout notch normally extending in exposed relation from said flange.

9. The invention as defined in claim 1, further characterized by an overlay panel for superimposition over the window means of said front panel and having a plurality of see-through windows in an arrangement to expose a selected chord sequence of said chord diagrams of said first panel in register with said window means of said front panel.

10. The invention as defined in claim 9, further characterized by a hook flange along one longitudinal edge of said overlay panel for hooking engagement over a longitudinal edge of said body member to horizontally align said windows of said overlay with said chord diagrams of said first panel.

References Cited

UNITED STATES PATENTS

| | | | |
|---|---|---|---|
| 1,594,977 | 8/1926 | Payne | 84—473 |
| 2,001,191 | 5/1935 | Golden | 84—485 |
| 2,657,610 | 11/1953 | Carran | 84—473 |
| 3,220,296 | 11/1965 | Giltzow | 84—480 |

RICHARD B. WILKINSON, *Primary Examiner.*

CHARLES C. OVERBEY, *Assistant Examiner.*